US012130179B2

(12) United States Patent
Groeneveld

(10) Patent No.: US 12,130,179 B2
(45) Date of Patent: Oct. 29, 2024

(54) SYSTEMS AND METHODS FOR CONVERTING SATELLITE IMAGES TO SURFACE REFLECTANCE USING SCENE STATISTICS

(71) Applicant: David P. Groeneveld, Hartford, SD (US)

(72) Inventor: David P. Groeneveld, Hartford, SD (US)

(*) Notice: Subject to any disclaimer, the term of this patent is extended or adjusted under 35 U.S.C. 154(b) by 741 days.

(21) Appl. No.: 17/244,855

(22) Filed: Apr. 29, 2021

(65) Prior Publication Data

US 2021/0247297 A1 Aug. 12, 2021

Related U.S. Application Data

(63) Continuation-in-part of application No. 16/918,291, filed on Jul. 1, 2020, now Pat. No. 11,640,653.

(60) Provisional application No. 62/921,710, filed on Jul. 1, 2019.

(51) Int. Cl.
*G01N 21/27* (2006.01)
*G01J 3/28* (2006.01)
*G01N 21/17* (2006.01)
*G06V 20/10* (2022.01)

(52) U.S. Cl.
CPC ............ *G01J 3/28* (2013.01); *G01N 21/274* (2013.01); *G06V 20/188* (2022.01); *G01N 2021/1793* (2013.01)

(58) Field of Classification Search
CPC .... G01J 3/42; G01J 3/28; G01J 3/0291; G01J 2003/425; G06V 20/188; G01N 21/538; G01N 21/274; G01N 2021/1793; G01N 2021/1795; G01N 2021/1797
See application file for complete search history.

(56) References Cited

U.S. PATENT DOCUMENTS 6,909,815 B2 6/2005 Bernstein et al.
9,396,528 B2 7/2016 Pacifici

FOREIGN PATENT DOCUMENTS

CA 2313802 1/2001
EP 2972221 B1 10/2014

OTHER PUBLICATIONS

Hagolle, Olivier, et al. "A multi-temporal and multi-spectral method to estimate aerosol optical thickness over land, for the atmospheric correction of FormoSat-2, LandSat, VENµS and Sentinel-2 images." Remote Sensing 7.3 (2015): 2668-2691. (Year: 2015).*

(Continued)

*Primary Examiner* — Vu Le
*Assistant Examiner* — Tracy Mangialaschi
(74) *Attorney, Agent, or Firm* — Scale LLP

(57) ABSTRACT

The present art applies a unique conceptual model that uses image statistics of top-of-atmosphere reflectance to assess and then reverse atmospheric effects. The workflow first calibrates the method for an Earth observation satellite pre-operationally. Then, for operational conversion of each image of the satellite, the degree of atmospheric effect is mapped across an image to be converted and then reversed to deliver surface reflectance data for each pixel of the image. The resulting surface reflectance images have haze and thin clouds removed, are clarified for viewing and appropriate for automated analyses.

19 Claims, 14 Drawing Sheets

(56) References Cited

OTHER PUBLICATIONS

Sola, Ion, et al. "Assessment of atmospheric correction methods for Sentinel-2 images in Mediterranean landscapes." International journal of applied earth observation and geoinformation 73 (2018): 63-76. (Year: 2018).*

Chavez, Pat S. "Image-based atmospheric corrections-revisited and improved." Photogrammetric engineering and remote sensing 62.9 (1996): 1025-1035. (Year: 1996).*

Chavez PS Jr. 1988. An improved dark-object subtraction technique for atmospheric scattering correction of multispectral data. Remote Sensing of Environment. 24:459-479.

Guidi L, Tattini M, and Landi M. 2017. How does chloroplast protect chlorophyll against excessive light? Intech Open Science. 21-36.

Kume, A. 2017. Importance of the green color, absorption gradient, and spectral absorption of chloroplasts for the radiative energy balance of leaves. Journal of Plant Researc.

Sayer AM, et al. 2014. MODIS Collection 6 aerosol products, etc. Journal of Geophysical Research: Atmospheres 13: 965-13,989.

Son M, et al. . 2020. Observation of dissipative chlorophyll-to-carotenoid energy transfer in light-harvesting complex etc. Nature Communications. 8 pp. doi.org/10.1038/s41467.

Vermote EF, Kotchenova S. 2008. Atmospheric correction for the monitoring of land surfaces. Journal of Geophysical Research. 113: 12pp.

Vermote E, et al. 2016. Preliminary analysis of the performance of the Landsat 8/OLI land surface reflectance product. Remote Sensing of Environment 185:46-56.

Zhang, M, Zu D, Su W, Huang J, Zhang X and Liu Z. 2019. Harmonizing multi-source remote sensing images for summer corn growth monitoring. Remote Sensing. 18pp.

ESA. 2015. Sentinel-2 user handbook. European Space Agency. 64 pp.

Groeneveld D and Barz D. 2013. Remote monitoring of surfaces wetted for dust control on the dry Owens Lakebed, California. Open Journal of Modern Hydrology. 3:241-252.

* cited by examiner

SYSTEMS AND METHODS FOR CONVERTING SATELLITE IMAGES TO SURFACE REFLECTANCE USING SCENE STATISTICS

CROSS REFERENCE TO RELATED APPLICATIONS

The present application is a continuation-in-part of U.S. patent application Ser. No. 16/918,291, filed Jul. 1, 2020, which claims priority to and the benefit of U.S. provisional patent application No. 62/921,710 filed Jul. 1, 2019. The disclosures of both the above applications are incorporated herein by reference in their entirety for any purpose

FIELD OF THE INVENTION

This method relates generally to the field of photonics in converting Earth observation satellite images of top-of-atmosphere reflectance to surface reflectance.

BACKGROUND

Images obtained by Earth observation satellites (EOS) are of growing importance for large scale management, including crop cover and health that affect food security, to defense reconnaissance to detect threats to name just two. EOS provide the means to monitor across vast regions of the Earth's surface. Orbiting above the atmosphere, EOS look through variable content of aerosols and gasses that affect the radiance, the amount of light recorded, and the reflectance calculated from it. Reflectance, radiance normalized by the sunlight received at the top of the atmosphere (TOA), is the property of interest for virtually all EOS image applications. The combined effect of variable aerosols and gasses is degradation of the reflectance signal and the useful information obtained from it. The effect of aerosols is called aerosol optical depth (AOD), a term of art. An abbreviation is used throughout this specification for the combined effects from AOD and gasses: AODg, a lumped sum parameter to assess the atmospheric effect giving rise to the TOA reflectance (TOAR) values recorded by the EOS.

For application to vegetation or crop performance analysis, digital EOS image data are combined mathematically in various ways depending upon the analysis desired. Such analyses are impacted by AODg due to changes in the reflectance data recorded. Conversion of the data to surface reflectance is a step that removes the AODg effects and is critical both for automated computer data analyses and for viewing of images. Atmospheric correction removes the effects induced by AODg. Atmospheric correction to surface reflectance, restores the quality of the data as if measured were there no atmosphere. Surface reflectance (SR) is the standard for atmospheric correction.

The calculations to atmospherically correct EOS data are complex. Prior art performs these calculations using the radiance recorded by the satellite. In contrast, the present art performs all calculations with reflectance. A large degree of uncertainty is associated with EOS imagery and so, the prior art achieves an estimate and not a measurement of SR. The present art Converts TOAR to SR that is also an estimate.

Present art estimates of SR begin with calibration of a yardstick for measurement of the atmospheric effect. A next step calibrates an EOS for the application of the method. Once these calibration steps are completed, operational correction can begin. "Operational" is used herein to recognize that the goal for application of the present art is the routine repeated conversion of TOAR to SR images. Calibration steps must take place before Operational application. In recognition that these procedures are unique to the present art, for distinction, both Operational and Calibration are capitalized throughout this specification.

The noun "Conversion" and verb forms Convert, Converting or Converted, are used throughout this disclosure to refer to the present art and are capitalized to draw this distinction. The present art uniquely Converts TOAR images to SR images using statistics from the EOS image, alone. The discussion herein will refer to reflectance, either expressed as TOAR or SR. To aid in understanding of the present art, a glossary is provided with this disclosure for terms generally used in the art or coined specifically for the present art.

EOS images consist of rasters of millions of spatially discrete pixels. Each pixel can contain multiple bands, each band having a discrete wavelength range of the spectrum—for example, the most common EOS configuration can have four bands described by the colors they represent in the visible spectrum: blue, green, red, and near infrared (NIR) whose spectral position is just beyond visible light. This disclosure focuses on these four bands, but the method is applicable to any imaging EOS band. All EOS bands are affected by passage of light through the atmosphere.

All calculations that Convert TOAR to SR are performed by computer. The present art causes the computer to Convert TOAR images to SR images in about one-tenth the computation time, more accurately and over more than twice the magnitude of atmospheric effects.

SUMMARY OF THE PRESENT PROCESS

A major limitation in prior art methods is the requirement for iterations to match radiance values to expected values of various ground targets. Iteration forces long computer runtimes that restrict prior art from achieving near real-time results, in one to three minutes. In addition, by using radiance values for the calculations, prior art methods bypass the significant simplification afforded through use of reflectance. The present art uses only reflectance data, TOAR, to drive image Conversion to SR; doing so in near real-time.

Other limitations of the prior art are the need to incorporate ancillary data collected by other EOS or by including other sensor bands aboard the EOS. Prior art cannot Convert images to SR for lightweight and compact EOS called variably called cubesats or smallsats because they omit radiometry that ensures accurate radiance measurements. This is an impediment because such EOS can economically be launched in flocks and so will dominate current and future EOS image gathering. The present art bypasses this limitation through the use of only three bands to apply the method: the blue, red and near NIR bands. These bands are born on virtually all EOS.

The present art applies a unique conceptual model to simplify the Conversion of TOAR EOS images to SR. Both calibration and image conversion to SR are performed using a single reference value to approximate the reflectance from continuous healthy canopies of vegetation in the blue band of each EOS. Blue reflectance properties express the strong absorbance of near-peak solar radiation in blue wavelengths that is mediated by plants to prevent injury from excess sunlight during clear days. A stable low reflectance for continuous healthy vegetation canopies is a consistent property for all plants that grow exposed to the open sky and so, can be used as a reference globally. The difference of this SR from TOAR reflectance in the blue band forms an SR yardstick that is an accurate estimator of the lumped sum parameter of atmospheric effects spatially across all bands of calibrated EOS.

Each EOS must be calibrated for use of the present art using a calibration target with paired dark and bright panels. Once calibrated, the present method can convert TOAR EOS data to SR from then on, but subject to recalibration in the event of sensor drift.

Once the atmospheric effects are estimated across the EOS image, the conceptual model can be employed to reverse those effects to deliver SR in near real-time. The conversion to SR is most accurate where there are numerous targets of continuous healthy vegetation canopies, and therefore, highly applicable to spatially sensitive Conversion to SR for agriculture and forestry applications. Where there are fewer such targets, a median value for the atmospheric effect can be used to drive the Conversion. Where no such targets are available, a representative value of atmospheric effect can be selected that is appropriate for time and place of the image.

BRIEF DESCRIPTION OF THE DRAWINGS

The accompanying drawings, which are incorporated in and form a part of the specifications, serve to promote an understanding of the Conversion. In the drawings.

DETAILED DESCRIPTION OF THE EMBODIMENTS OF THE INVENTION

Throughout this specification, the term EOS is used to refer generally to any EOS. Where EOS is accompanied by the definite article, it refers to the specific EOS undergoing calibration or other attention in preparation for Conversion.

Sections 1 through 5 of this disclosure describe procedures new to the present art or applied in ways differing from the prior art. Section 6 presents detailed workflows for the present art for implementing the calibration and Conversion procedures briefly described in the previous sections. These procedures require adoption of new technical terms and application of existing terms known only in the art to assist understanding. Section 7 is a glossary defining existing and new terminology used in this disclosure to assist understanding this specification. New terms are capitalized and bolded in the glossary and other sections to differentiate them from the existing terms.

1. Conceptual Model to Convert TOAR to Surface Reflectance

For application of Conversion, calibration activities must be performed first. Unless the relative spectral responses are equivalent to an already calibrated EOS, each new EOS must undergo calibration. After calibration of the EOS, the Conversion delivers SR for that EOS from then on, but subject to recalibration in the event of sensor drift.

Figure 1:
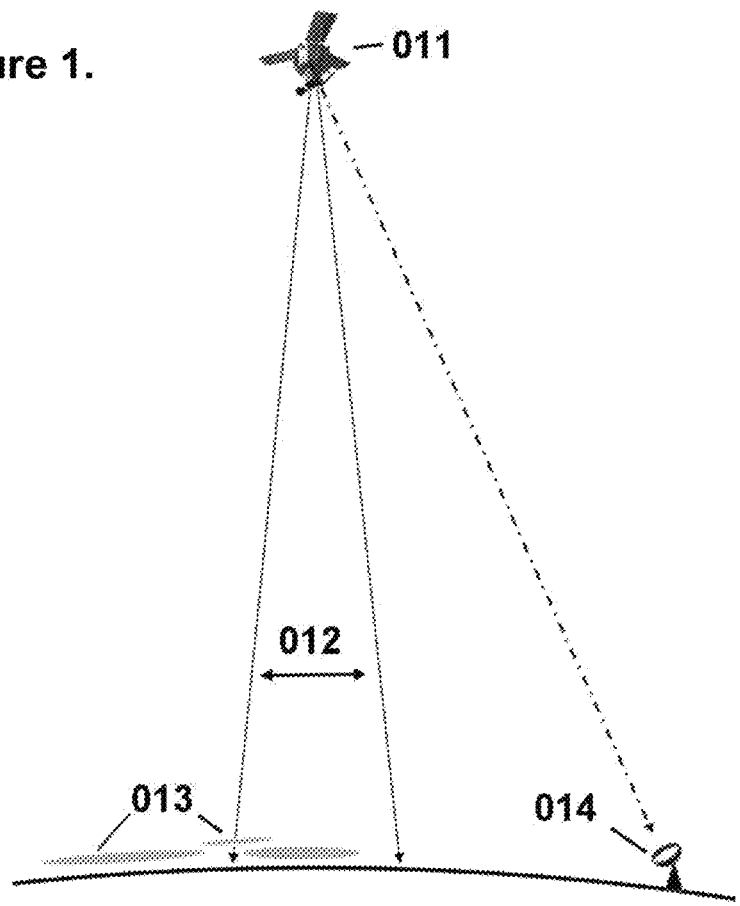
FIG. 1 illustrates an imaging EOS recording data and transmitting it to a ground station.

FIG. 1 illustrates how imagery is acquired by an EOS 011 that records the amount of reflected light (radiance) from within a field of view 012 that is affected by an atmosphere that contains airmasses with variable AODg 013. The recorded radiance data are transmitted to a ground station 014 that distributes the affected data to the company fielding the EOS. The EOS organization processes the data to ensure accurate geographic location, and expressed as reflectance through normalizing by the TOA solar radiance.

The present method can begin after the image is downloaded, or alternatively, the software can reside within the EOS, wherein it can perform the Conversion onboard and then transmit the corrected SR image directly to the ground station. This is a unique potential for the present art because the Conversion can be made near real-time, on the order of a minute.

The focus for the Conversion is TOAR. Normalizing radiance by the TOA solar irradiance removes variability in the data due to daily and/or seasonally varying levels of solar radiation Consequently, this the preferred dataset for use in nearly all remote sensing applications using EOS image data.

Figure 2:
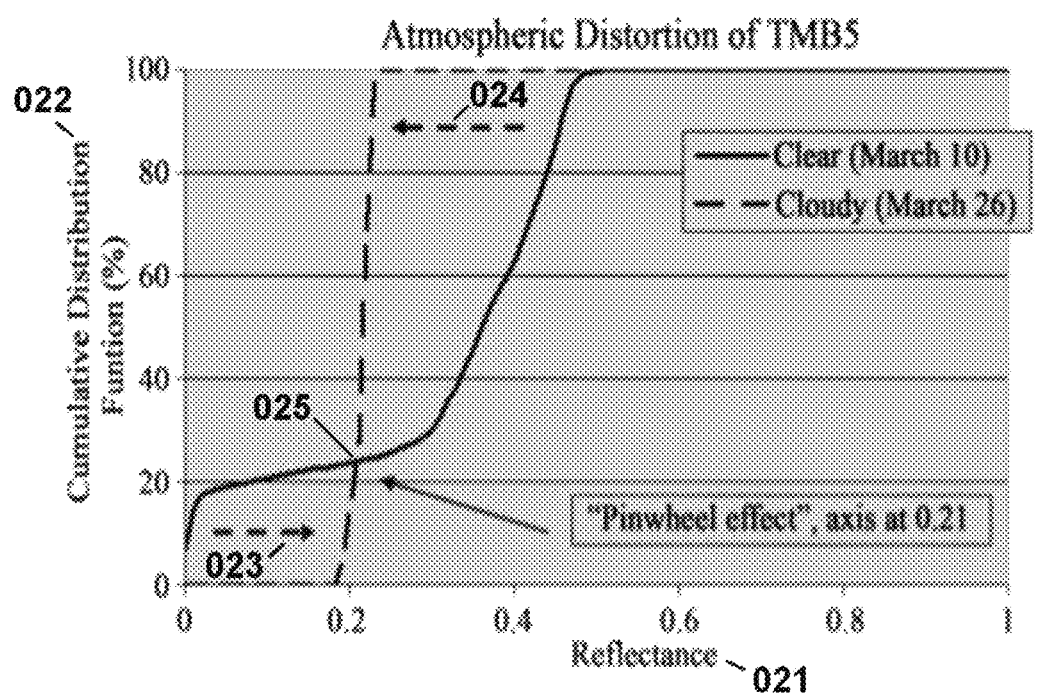
FIG. 2 illustrates the Pinwheel Effect described by Groeneveld and Barz (2013)

The Conversion maps and reverses atmospheric effects using a conceptual model based on a natural phenomenon observed by Groeneveld and Barz (2013. Open Journal of Modern Hydrology 3:241-252) dubbed the "Pinwheel Effect", as illustrated in FIG. 2. An observable change in TOAR levels 021 can be seen between the cumulative distribution 022 acquired on the "clear" day (low AODg) compared to the data acquired on the "cloudy" day (high AODg). On the cloudy day, the reflectance levels of darker objects increased due to backscatter effects 023, while the reflectance levels of brighter objects decreased due to attenuation effects 024. There is a reflectance level, dubbed the Axis point, where the two effects cancel 025. Thus, the Pinwheel Effect causes such curves to spin counterclockwise for increasing AODg and clockwise for decreasing AODg, resulting in constantly changing reflectance levels for all EOS bands for all pixels across the image.

Figure 3:
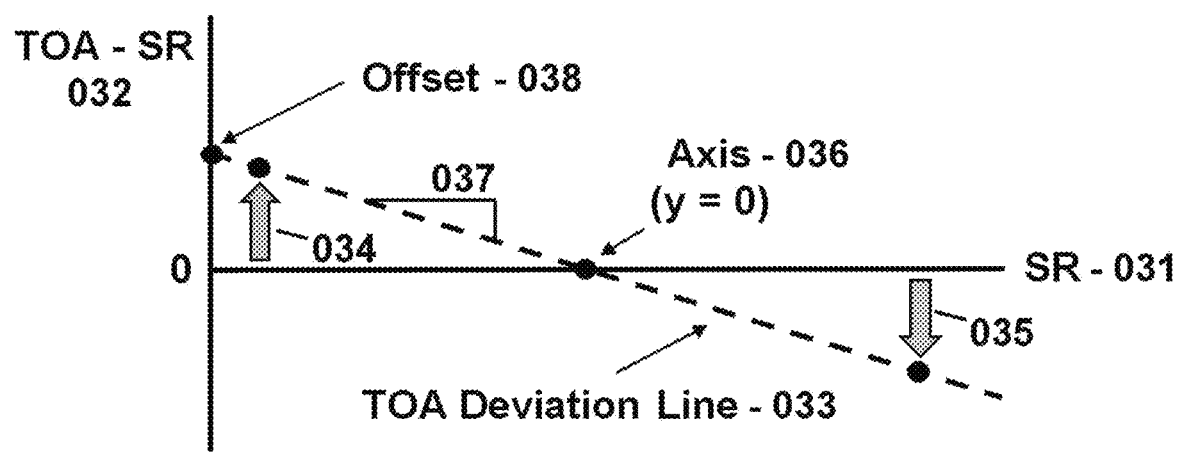
FIG. 3 illustrates the conceptual model for Conversion.

FIG. 3 presents the conceptual model that was derived through study of the Pinwheel Effect. The conceptual model provides the means to Convert TOAR to SR. The Conversion is necessary for each band of EOS sensors as these bands respond in the same general manner but to a different degree. Such changes are influenced by the position of the EOS band within the spectrum: the shorter the wavelength, the more affected by AOD while at longer wavelengths, reflectance is more affected by gasses, particularly water vapor.

The x-axis of FIG. 3 is SR 031, and the y-axis is the TOAR recorded by the EOS modified from SR by transmission through the atmosphere. The y-axis is defined as the difference of SR from TOAR: TOAR—SR 032. Measured points from dark and bright targets are shown that establish a TOA Deviation Line 033. Due to AODg effects, darker reflectance is enhanced through backscatter (gray arrow up; 034) and brighter reflectance values are decreased due to attenuation (gray arrow down; 035). The degree of these effects is variable across the reflectance distribution and represented as the TOA Deviation Line. The Axis 036 occurs in-between where the opposing effects of scatter and attenuation are equivalent and self-cancelling. The TOA Deviation Line for any AODg magnitude has a slope 037 and an offset 038 that are used as the parameters for reversal of the AODg effects to estimate SR. The TOA Deviation Line can vary according to the AODg effects—both slope and offset increasing in magnitude for increasing AODg, and falling for decreasing AODg.

The conceptual model is new to science and is incorporated in this Conversion to address pixels across an image of any TOAR magnitude, dark to light. The conceptual model of FIG. 3 can be used to corrects images when expressed mathematically by Equation 1. The TOA Deviation Line represents a range of SR values modified through the Pinwheel Effect of FIG. 2. The slope (m) and the offset (b) are the parameters in Equation 1 that Convert each pixel across the image from TOAR to SR described below.

$$SR=(TOAR-b)/(1+m) \quad \text{Equation 1}$$

Through Equation 1, the Conversion performs all calculations using image statistics of TOAR, alone, without ancillary data. These closed-form mathematics are efficient and rapid, taking $1/10^{th}$, or less the runtime of prior art methods that use radiance values and iteration. Through the pinwheel effect, it is apparent that AODg expression causing the change from SR to TOAR is highly structured. The Conceptual Model and Equation 1 captures this structure permitting Conversion to deliver estimates of SR. By contrast, prior art relies upon theoretic and comparatively complex relationships that characterize how radiance is scattered, absorbed, and transmitted that are determined through iterative fitting. Such prior art procedures prevent near real-time atmospheric correction that is especially needed for crop monitoring, disaster monitoring and defense reconnaissance applications.

2. A Vegetation Surface Reflectance Yardstick to Estimate AODg

The use of vegetation targets to judge aerosol loading is well established through the MODIS, Landsat and Sentinel 2 programs that similarly employ vegetation as a reference. Conversion builds on the reference capacity of vegetation by calibrating and identifying SR through the use of three EOS bands. These bands can be used to identify locations in the TOAR image where appropriate vegetation can be used for reference. The use of "yardstick" in this context recognizes that a standard is defined against which to measure the AODg effects. Because of differences in relative spectral response for the blue band of each satellite, this quantity can be established for each EOS and quantified from field data. The continuous traces of spectrometer data must be transformed into the bands of each EOS for application to the Conversion. The calculation for "banding" the spectrum into the spectral bands for the satellite is a well-known operation of integrating the product of the sensor relative spectral response and the hyperspectral reflectance, a quantity then divided by the integrated sensor relative spectral response. Relative spectral responses for the sensors of EOS are typically published for EOS data users.

Figure 4:
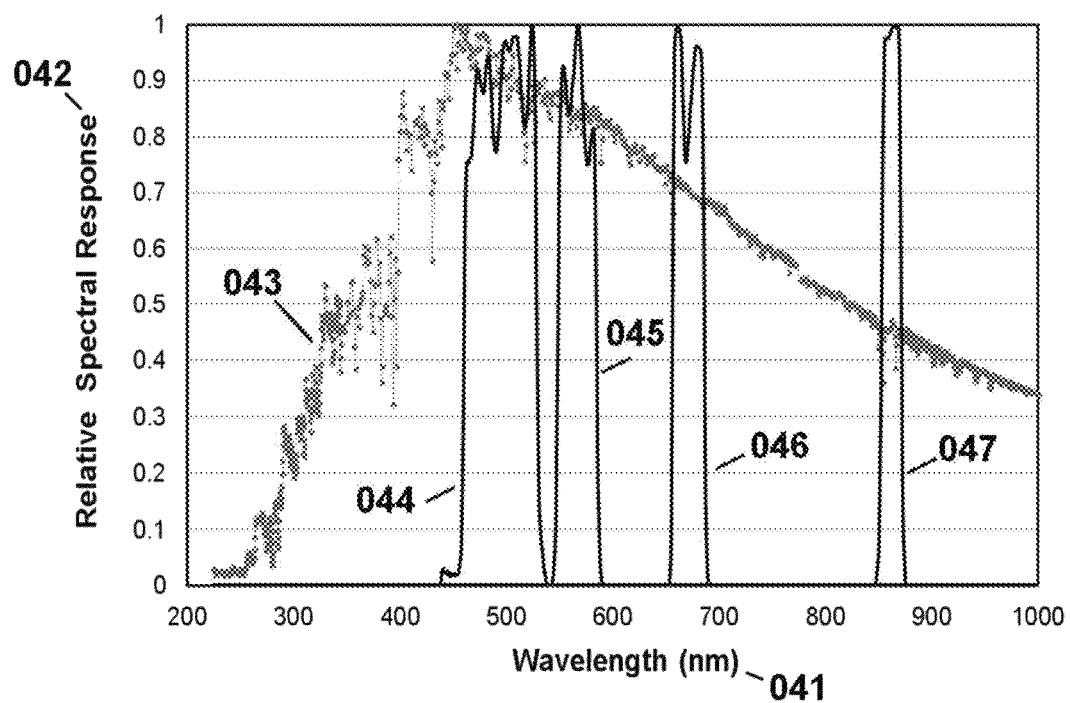
FIG. 4 is a graphic representation of the TOA solar radiance curve and the relative spectral responses of the Sentinel 2 EOS.

FIG. 4 illustrates the relative spectral responses for the four bands of the Sentinel 2 EOS. The independent variable is wavelength 041 with relative spectral response 042 that have been normalized to one for each band by dividing through by the highest radiance response within the band—such calculations are performed for the user by the supplier of the image. As an example, the relative spectral responses 042 for Sentinel 2 bands are plotted according to the wavelength 041 for blue 044, green 045, red 046 and NIR 047. Once the spectrometer data are banded for the relative spectral responses of the EOS, they are representative of the SR for that EOS.

The appropriateness of vegetation targets on images for AODg quantification is due to a shared physiological property of all plants that grow with open exposure to the sky. Such exposure risks potential damage to photosynthetic capacity due to absorption of excessive solar energy. Photosynthesis saturates at about one quarter of midday full sun. Plants employ carotenoid pigments to absorb the excess solar radiation and then dissipate it as heat. The highest level of energy occurs in the region of the blue band, as shown in the TOA solar radiance curve 043 in FIG. 4. This is where the carotenoid pigments absorb the maximum amount of light. Though the relative spectral response may vary somewhat, the blue band of EOS captures the peak absorbance response due to carotenoid pigments. Consequently, the level of reflected energy from living plants in this spectral region is significantly reduced. This low, relatively stable reflectance across virtually all high light plant species enables use of SR of a continuous healthy canopy (CHC) of vegetation to be used as a yardstick against which to measure AODg effects. This minimal blue reflectance from CHC vegetation, abbreviated SR MinB, was chosen as the SR reference value against which AODg effects can be estimated. Operating in this capacity, TOAR MinB can be calibrated to be a surrogate for AODg.

Figure 5:
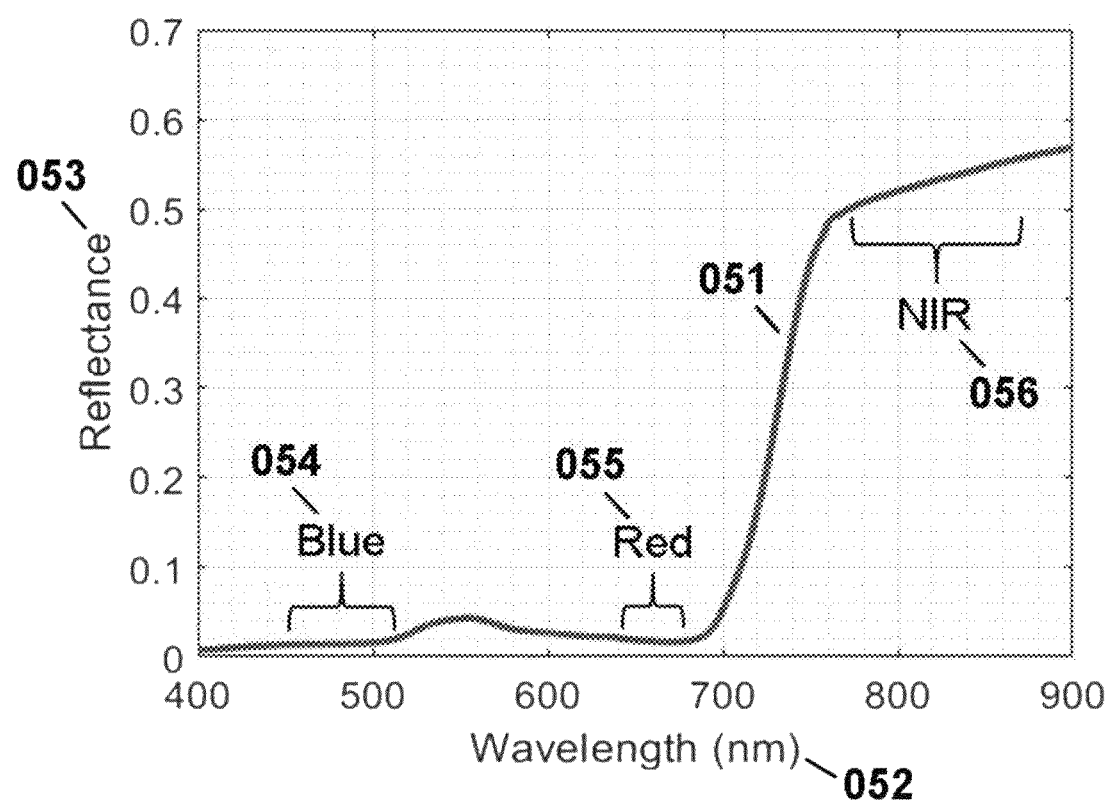
FIG. 5 is a spectrum collected by spectrometer over continuous healthy cover (CHC) of lawn grass.
Figure 6:
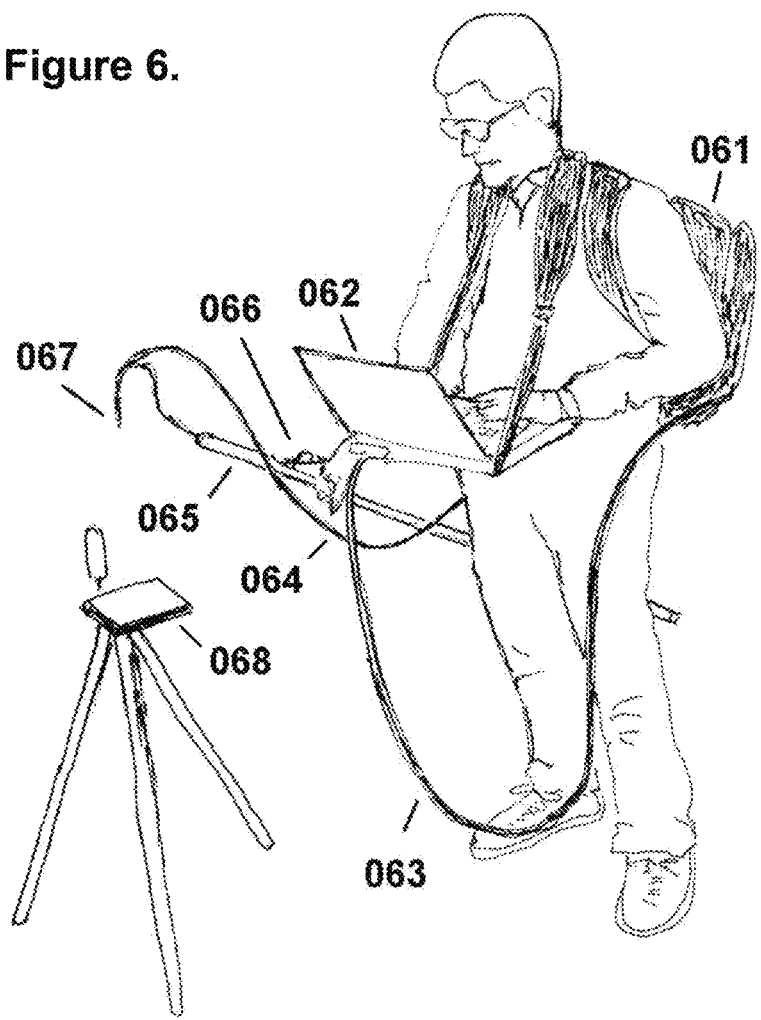
FIG. 6 is a drawing of field spectrometry equipment for measuring and recording surface reflectance.

FIG. 5 shows a representative CHC vegetation SR spectrum of lawn grass acquired by field spectrometer measurements (FIG. 6). The spectrum of FIG. 5 is a continuous trace 051 across wavelength 052 of SR 053 extending through the visible (blue, 400 nm) into the near infrared (NIR, 900 nm). The ranges for the three bands of Sentinel 2 used in the Conversion, blue 054, red 055 and NIR 056, are shown. The low reflectance of CHC vegetation such as that visible in the blue band 054 of FIG. 5 is used by the Conversion as the AODg yardstick. The CHC vegetation yardstick of low, stable reflectance can be established by measuring spectra over CHC vegetation.

While EOS blue and red bands exhibit low reflectance from CHC vegetation, the blue band is more highly influenced by AODg than the red band; consequently, it was selected as the measure to calibrate estimations of AODg effects. NIR 056 is highly reflected by vegetation, and in combination with the red band, constitutes the well-established normalized difference vegetation index (NDVI), which is used in the Conversion process to identify whether any blue TOAR on an image was generated by CHC vegetation (Equation 2).

$$NDVI=(NIR-Red)/(NIR+Red) \quad \text{Equation 2}$$

NDVI is unitless and calculated from red and near infrared broad bands of EOS data according to Equation 2, where NIR is near infrared reflectance, and Red is red reflectance.

Returning to FIG. 6, the equipment appropriate for field spectrometry applications for the Conversion includes the spectrometer borne within a backpack 061 connected to a laptop 062 by an electronic cable 063. A fiber optic cable 064 extends from the spectrometer to a wand 065 that is outfitted with a bubble level 066 to ensure that the foreoptic is positioned for a nadir look 067. A tripod-mounted white reference panel 068 is also shown for measurement of solar radiance that is used by the spectrometer software to normalize the radiance measured by the spectrometer to SR. The resulting SR data are then used to identify SR MinB, and SR band equivalents for the EOS using the relative spectral responses of the EOS bands. SR MinB constitutes the vegetation yardstick.

A median blue band value to be used as the SR yardstick MinB can be determined from the pooled spectra collected over CHC vegetation. For identification of CHC vegetation, SR MinB enters into an additional calibration step to prepare calculations for the EOS. Red and NIR values of each spectrum collected can be used to calculate NDVI values according to Equation 2. These NDVI values are pooled and the $25^{th}$ percentile can be chosen as the NDVI SR Threshold, a value that is adjusted in Section 4 through further calibration into an NDVI TOAR Threshold Curve for identification of CHC as TOAR MinB values increase due to AODg. A lower value of the NDVI SR Threshold, for example the $25^{th}$ percentile, can be used because median values of NDVI (approximately the $50^{th}$ percentile) can be too stringent for selection of sufficient TOAR MinB values for sensitively correcting across varying spatial patterns of AODg.

The reflectance values that contributed to the NDVI SR Threshold at the lower $25^{th}$ percentile can be determined from the pooled data. These are average values for an NIR SR Reference, and a Red SR Reference measured just above and below NDVI SR Threshold, for example, restricted to within a range of plus or minus 0.005 of the NDVI SR Threshold. These averaged red and NIR reference values enter the workflow and are described further in Section 4 in a workflow that adjusts the NDVI SR Threshold downward due to increasing AODg assessed through its surrogate, TOAR MinB. This workflow is necessary because the red and NIR component bands for NDVI, change as AODg, represented by TOAR MinB, changes.

3. Calibrating the EOS for Image Conversion

TOAR MinB assessed across images provides a spatially-sensitive estimate of AODg. TOAR MinB representation of AODg constitutes a lumped sum parameter for the effects due to AOD and gasses that are evaluated without differentiation for their contributing effects. Like all indices, TOAR MinB and NDVI used in the Conversion, are unitless Recapitulating Equation 1 and the conceptual model of FIG. 3, only two parameters are needed to provide pixelwise Conversion of TOAR to SR. Through calibration of the EOS, TOAR MinB can be translated into the two parameters needed by Equation 1: these are the slope and offset of the TOA Deviation Line.

Figure 7:
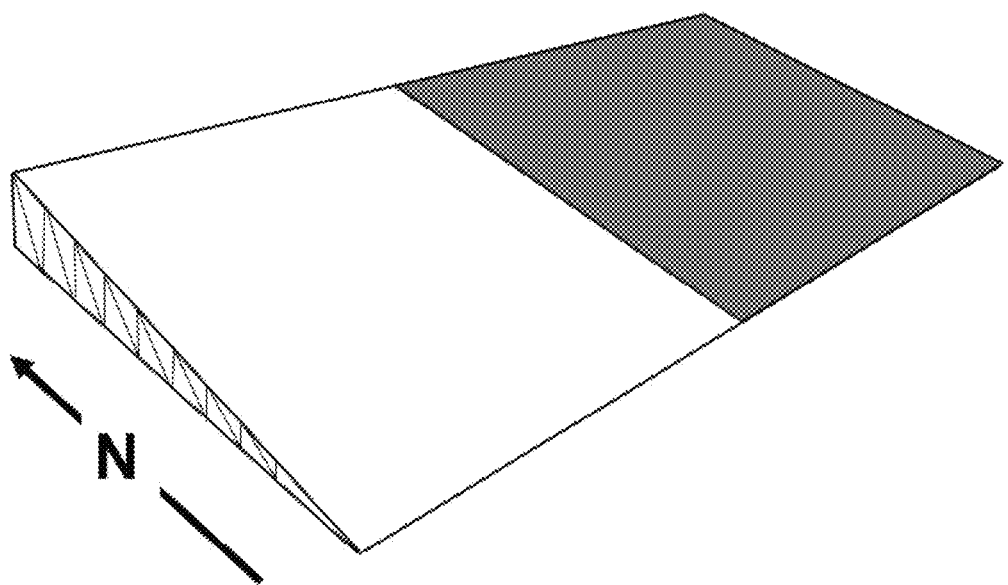
FIG. 7 is a generic image of a calibration target that has dark and bright panels.

Calibrating the EOS to use the Conversion is a three-step process. The first step in calibrating the EOS can be accomplished using a calibration target (FIG. 7) with dark and bright calibration panels of sufficient size to capture multiple pure pixels of TOAR for the EOS images used in the calibration. Pure, in this context means the lack of spectral mixing of the target with features sampled from off the calibration target panels. TOAR pixels on the calibration target can be determined to be pure by the minimal variability of reflectance values in each band. The pure pixels are averaged to represent TOAR for comparison to the SR measured by spectrometer.

All EOS bands to be Converted can be calibrated. The spectrometer data, gathered during a four hour period around midday under clear skies, can represent the dark and light panels after first being transformed to band responses of the EOS to arrive at the band-wise SR translated for the EOS. The dark- and bright-panel SR data are paired with the dark- and bright-TOAR data to yield dark and bright reflectance levels that define the TOA Deviation line as in FIG. 3. Each overpass defines a unique TOA Deviation Line and the corresponding slope and offset that can be calculated from the line.

The second step is to determine the MinB value for each overpass. Returning to the discussion of the vegetation yardstick of Section 2 that established SR MinB with spectrometry, the single calibrated value of SR MinB for the EOS has a corresponding y-value lying on the TOA Deviation Line for the quantity (TOAR MinB—SR MinB). Thus, the TOAR MinB value recorded by the EOS is equivalent to the SR MinB plus the y-axis quantity predicted by inversion of Equation 1. TOAR MinB is used as the independent variable that defines the Conversion for all bands.

The third step establishes two Master Curves for each band to predict slope and offset as a function of TOAR MinB. The Master Curves translate any TOAR MinB value into slope and offset for input to Equation 1 to drive the Conversion appropriate for the degree of affect from AODg represented by TOAR MinB. The x-axis of both slope and offset Master Curves is TOAR MinB. The corresponding calibrated y-values of slope and offset for each overpass establish the Conversion to SR from any TOA MinB input, however, this correction is valid only for the MinB magnitude of that overpass. Multiple calibration overpasses extend the Conversion to a range of TOAR MinB magnitudes. Taken together, values of slopes can be pooled together across the magnitude of MinB inputs, and a function can be fitted from this pooled data to form a slope Master Curve. Similarly, offset values derived in this process can be pooled and fitted to form the offset Master Curve.

Figure 8:
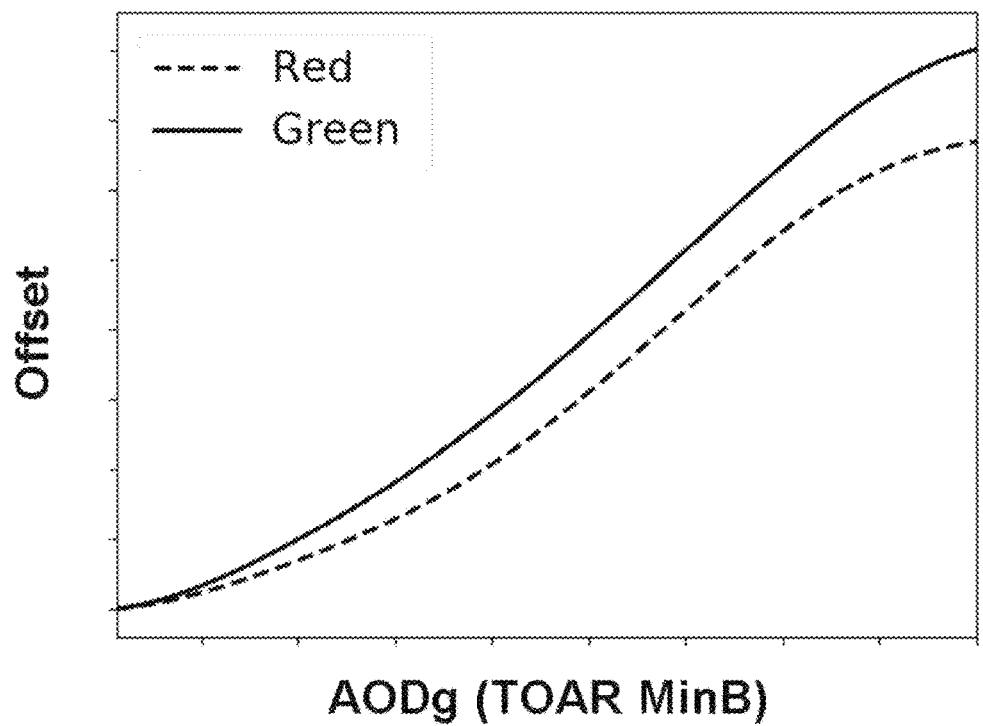
FIG. 8 is a graphic representation of offset Master Curves for red and green bands of the Sentinel 2 EOS.

The Master Curves of slope and offset are used to estimate these two parameters for the entire range of correctable AODg. Example offset Master Curves for the Sentinel 2 green and red bands are presented in FIG. 8. Master Curves start with two overpasses and expand to greater ranges for correction as the MinB from subsequent overpasses capture lower or higher AODg conditions. Master Curves can be extrapolated only with caution because, as shown in FIG. 8, Master Curves are complex and non-linear due to atmospheric feedback. Therefore, full calibration of this method requires many overpasses under varying degrees of AODg estimated by its surrogate, TOAR MinB.

4. Adjusting the NDVI Threshold for Effects from AODg

Figure 9:
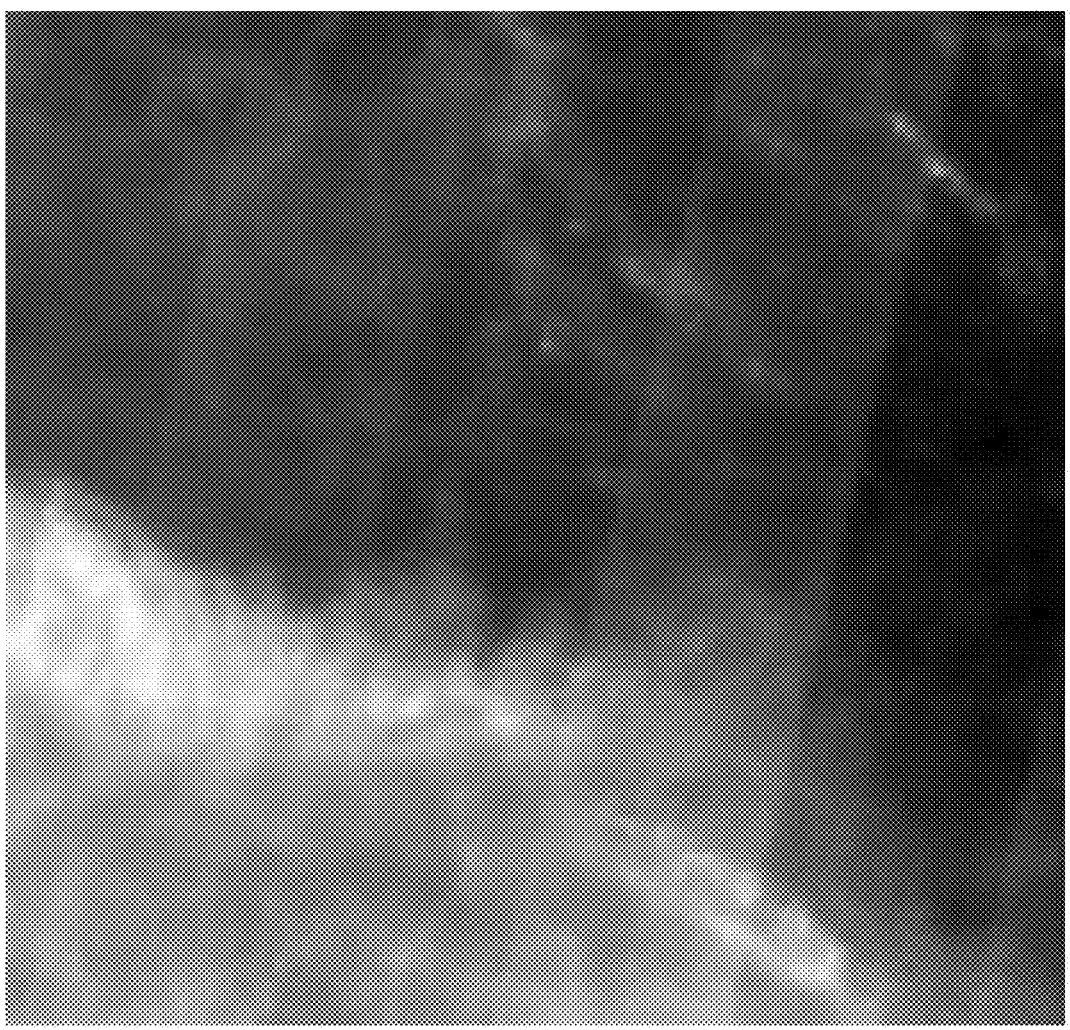
FIG. 9 is a grayscale image of TOAR MinB mapped from Sentinel 2 over the Amazon Basin.
Figure 10:
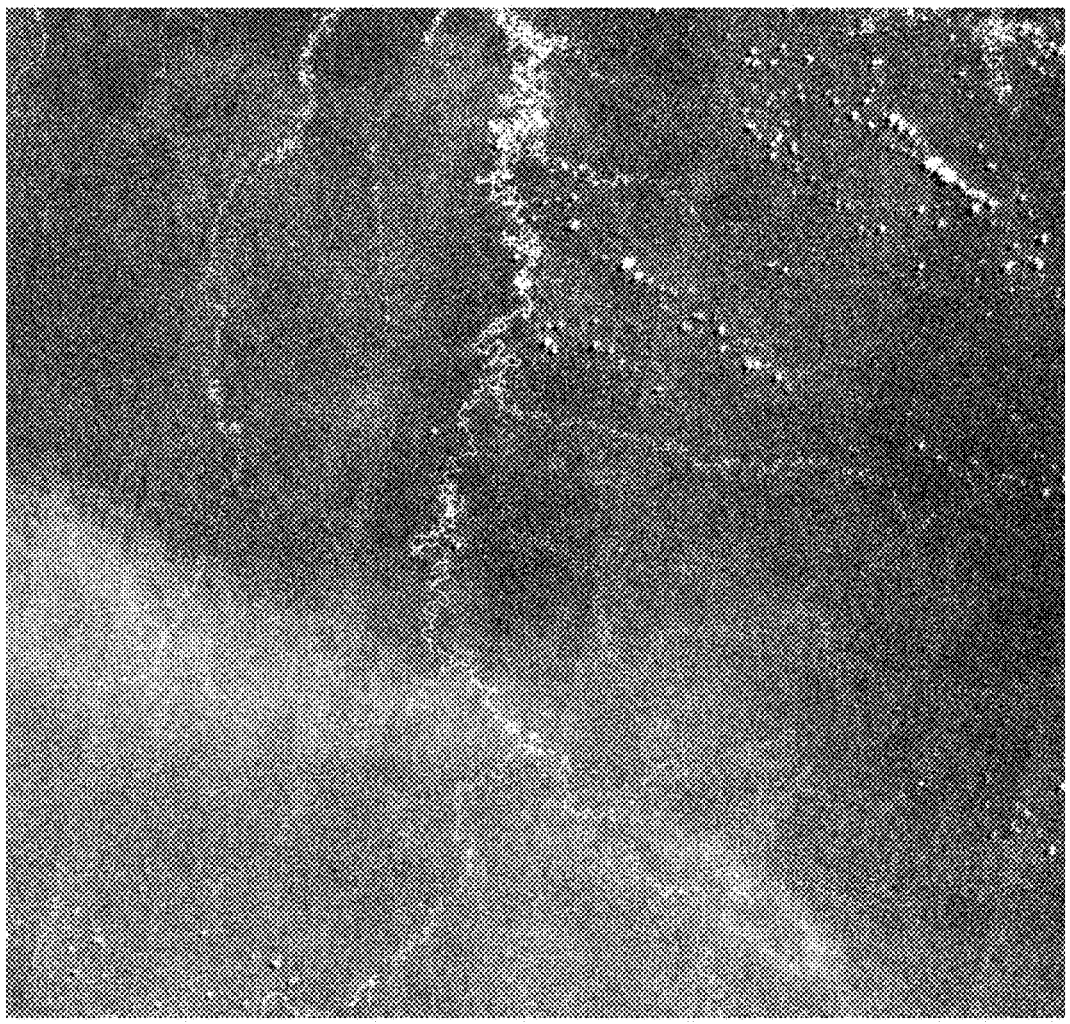
FIG. 10 is a grayscale image of a red-green-blue color portrayal of TOAR, the data from which TOAR MinB was mapped in FIG. 9.
Figure 11:
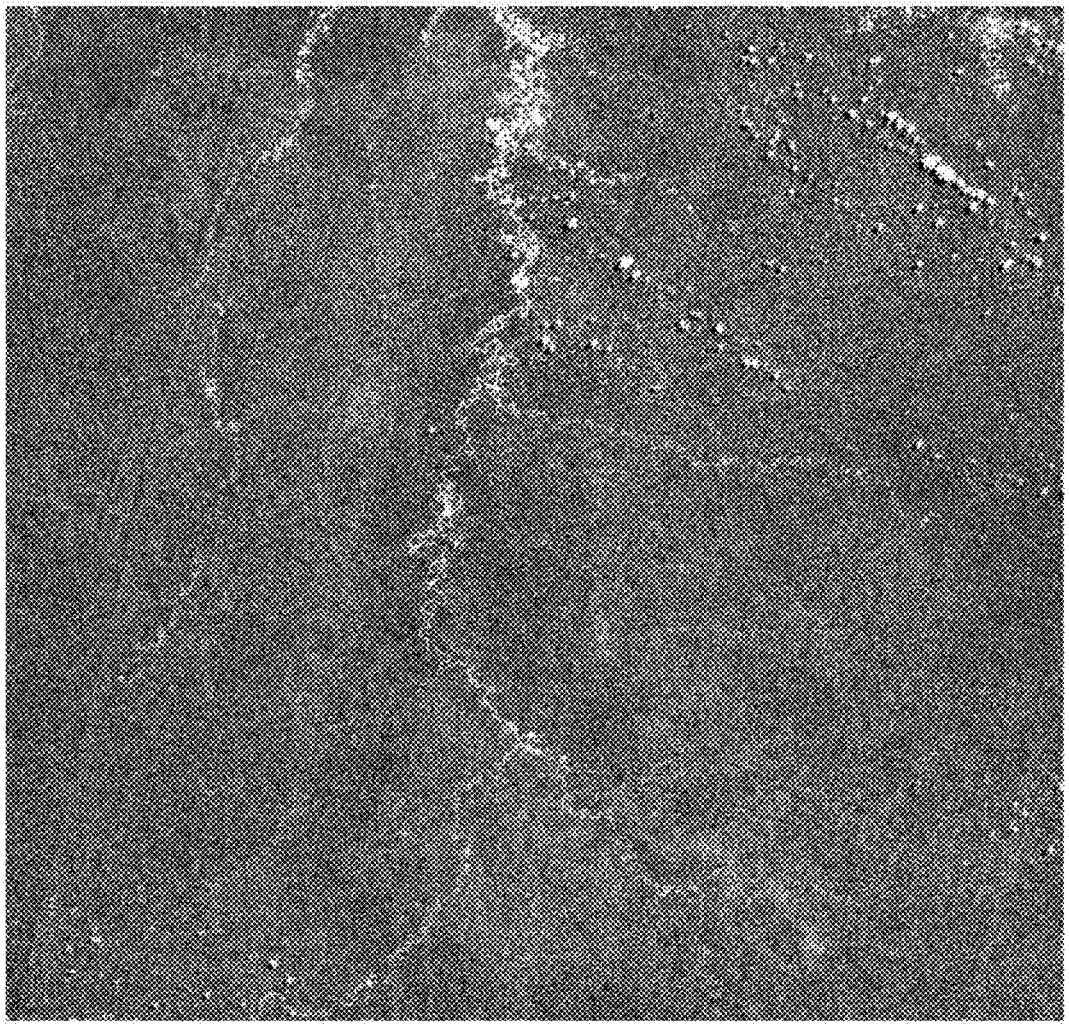
FIG. 11 is a grayscale image of a red-green-blue color portrayal of SR Converted from the TOAR data shown in FIG. 10.

As illustrated by FIG. 9, TOAR MinB can provide sensitive assessment of atmospheric effects at high granularity across the image. Also visible in FIG. 9, the MinB raster provides a correction for calibration problems inherent in image processing from the vendor/supplier (in this case European Space Agency). Such problems are visible in FIG. 10, a grayscale representation of a true color TOAR rendition that exhibits the same pattern as the haze and image striping mapped as TOAR MinB in FIG. 9. Striping and haze have both disappeared after Conversion to SR (FIG. 11). This image series illustrates TOAR MinB across an image whose high variability is accurately captured by the abundant CHC vegetation of the Amazon rainforest.

To provide robust functionality, TOAR MinB can be restricted solely to CHC through choice of TOAR pixels that have NDVI exceeding an established NDVI threshold. An NDVI TOAR Threshold to identify CHC must be dynamic and change as MinB changes. Returning to FIGS. 2 and 3, the Pinwheel Effect represented by the conceptual model illustrates that increasing AODg will cause low reflectance to increase and high reflectance to decrease. From Equation 2, it is evident that under increasing AODg, there will be a synergistic decrease in NDVI because vegetation has low reflectance in red wavelengths (which will increase) and high reflectance in NIR wavelengths (which will decrease).

To compensate and correctly identify CHC under increasing AODg, the SR MinB calibration data described in Section 1 can be revisited. The Red SR Reference and the NIR SR Reference introduced in Section 3 can be adjusted using the calibrated values of MinB in Master Curves described in Section 3. At each step, the red and NIR slopes and offsets are entered into an inverted Equation 1 (determining TOAR as a factor of SR). Through these calculations, the SR reference values for red and NIR yield their TOAR equivalents to form a curve according to a range of simulated TOAR MinB input values within the calibrated range of the Master Curves for the EOS. These values can then be combined using Equation 2 to yield TOAR NDVI that, combined with the MinB values, gave rise to the TOAR NDVI for the simulated MinB values. A fitted function for this combination yields the TOAR NDVI Threshold Curve.

Figure 12:
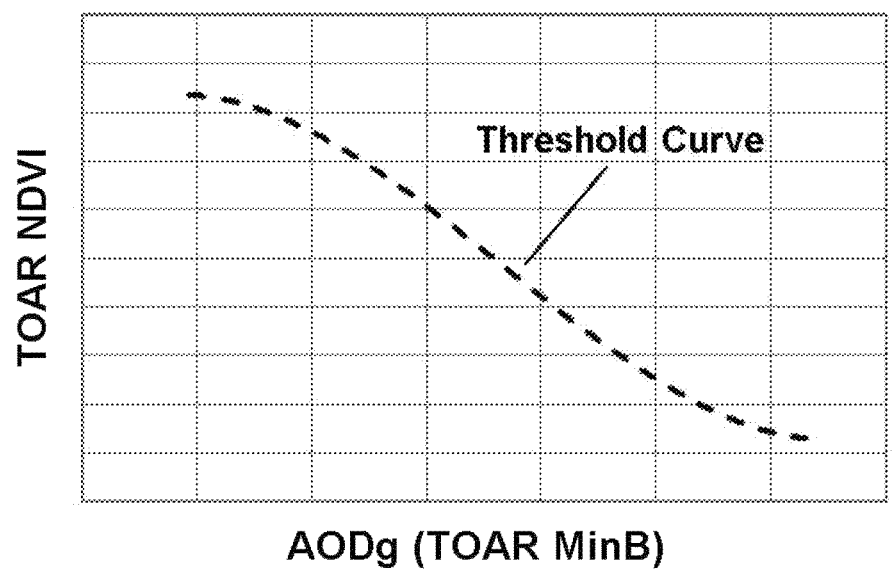
FIG. 12 is an NDVI TOAR Threshold Curve.

Summarizing this workflow for adjusting the NDVI Threshold: (1) Master Curves derived through calibration in Section 3 determine the slope and offset for the red and NIR bands for a range of MinB: (2) The slope and offset curves define TOAR red and NIR values through inversion of Equation 1 for the range of calibrated MinB values (restricted to the range of calibrated MinB values per the workflow in Section 3); (3) TOA values for red and NIR can be combined to yield TOAR NDVI according to Equation 2; and (4) a curve of TOAR NDVI can be fitted on the TOAR MinB values that generated them to establish an NDVI TOAR Threshold Curve appropriate for the EOS, as shown in FIG. 12.

5. Mapping Atmospheric Effects Across the Image as TOAR MinB

Choosing the blue reflectance value across an image to represent the atmospheric effects as TOAR MinB can be accomplished as a reductive process beginning with three steps that create and apply raster maps of the entire image. Low values of blue reflectance are candidates for TOAR MinB, however, to qualify as a TOAR MinB, these pixels must have been generated by continuous, healthy, canopy (CHC) vegetation. As a first step in the TOAR MinB mapping procedure, pixel values of any blue reflectance can be masked from consideration that have low reflectance due to pixel mixing or some competing attribute. These pixels can be identified using an NIR TOAR threshold, and then can be removed from consideration if their NIR TOAR is less than the threshold value. This operation leaves a residual of pixels with higher values of TOAR NIR that are expected for CHC vegetation, though still potentially containing high NIR, not from CHC but from overall bright reflectance, for example white rooftops, crop residues on fields, and the like. Choosing the NIR TOAR value is best done by trial and error. As a guidepost, 0.15 reflectance is an acceptable value for the NIR TOAR threshold for Sentinel 2. This value can be used as a general guideline, however the actual value to be used for other EOS should be tested, the output evaluated for its ability to remove pixels that are not CHC vegetation under high AODg, and the threshold adjusted, as necessary.

A second step removes all pixels with high blue reflectance that exceed a threshold for a TOAR MinB, above which, the pixels cannot be Converted. As a guideline, the TOAR MinB threshold approximating what can or cannot be corrected is 0.20. Again, other EOS may be different, so this value will need to be tested, the output evaluated, and the threshold adjusted as necessary.

The third and final raster step is to remove all remaining blue pixel values that were not generated by CHC vegetation. These pixels are detected by comparing the residual pixel values to the predicted value of NDVI at each residual blue TOAR from the NDVI TOAR Threshold Curve (FIG. 12) generated in Section 4. If the TOAR NDVI value exceeds the corresponding NDVI TOA Threshold value, it is accepted as being generated by CHC; if not, it is removed from further consideration for identification of TOAR MinB. The remaining pixels across the image are all candidates to become one of the representative TOAR MinB values.

A final step to choose representative TOAR MinB across the image can be performed statistically using Pixel Grid Sampling that preserves the spatial distribution of the TOAR MinB values. Representative MinB values are chosen from the candidate TOAR MinB values by sampling the collection of candidate pixels within spatially discrete gridcells. For example, a grid of 100×100 pixels generates a potential statistical sample of 10,000 pixels, but generally having only a fraction of these pixels. The pooled blue pixel values within each gridcell can be ranked from low to high. The workflow can then select some low but non-zero percentile value of TOAR MinB, for example at the $15^{th}$ percentile. Choosing a low but non-zero percentile value for representative TOAR MinB bypasses any potentially erroneous low values of blue TOAR. A selected value of blue reflectance is the representative MinB for a gridcell containing the candidate CHC samples. If no values of MinB are available or are too few in number to constitute a robust sample, the gridcell is left unfilled. In this manner, the Pixel Gridcell Sampling moves across the image creating a raster of filled and unfilled grid cells that results in a map of MinB representative of the AODg effects as in FIG. 9.

Any unfilled gridcells can be filled by interpolation, for example by the inverse distance weighted method. The highest accuracy for this Conversion will occur when images are almost completely saturated with TOAR MinB values FIGS. 9-11 of the Amazon rain forest provide an example of the accuracy that can result when a nearly complete sample of MinB data are available. In some cases, MinB will be available for correcting portions of the image but insufficient for spatially-defined correction. In that case, a representative value can be chosen for the entire image as the median value of the MinB samples. In other cases, no MinB values may be located—a desert lacking agriculture or other CHC vegetation, for example. In such cases, a TOAR MinB value can be chosen for the entire image that is appropriate for the time of year and geographic location to provide a reasonable approximation of SR—the same approach has been adopted by prior art.

TOAR MinB developed from vegetation provides a robust and accurate estimation of SR. When no CHC vegetation is available on the image, other dark targets can also be used such as water or deep shadow. If these are used, care must be given to assure that such alternatives are calibrated against TOAR MinB developed from vegetation to assure that all values are suitably scaled and comparable.

6. Detailed Workflow to Establish and Apply the Method

Figure 13:
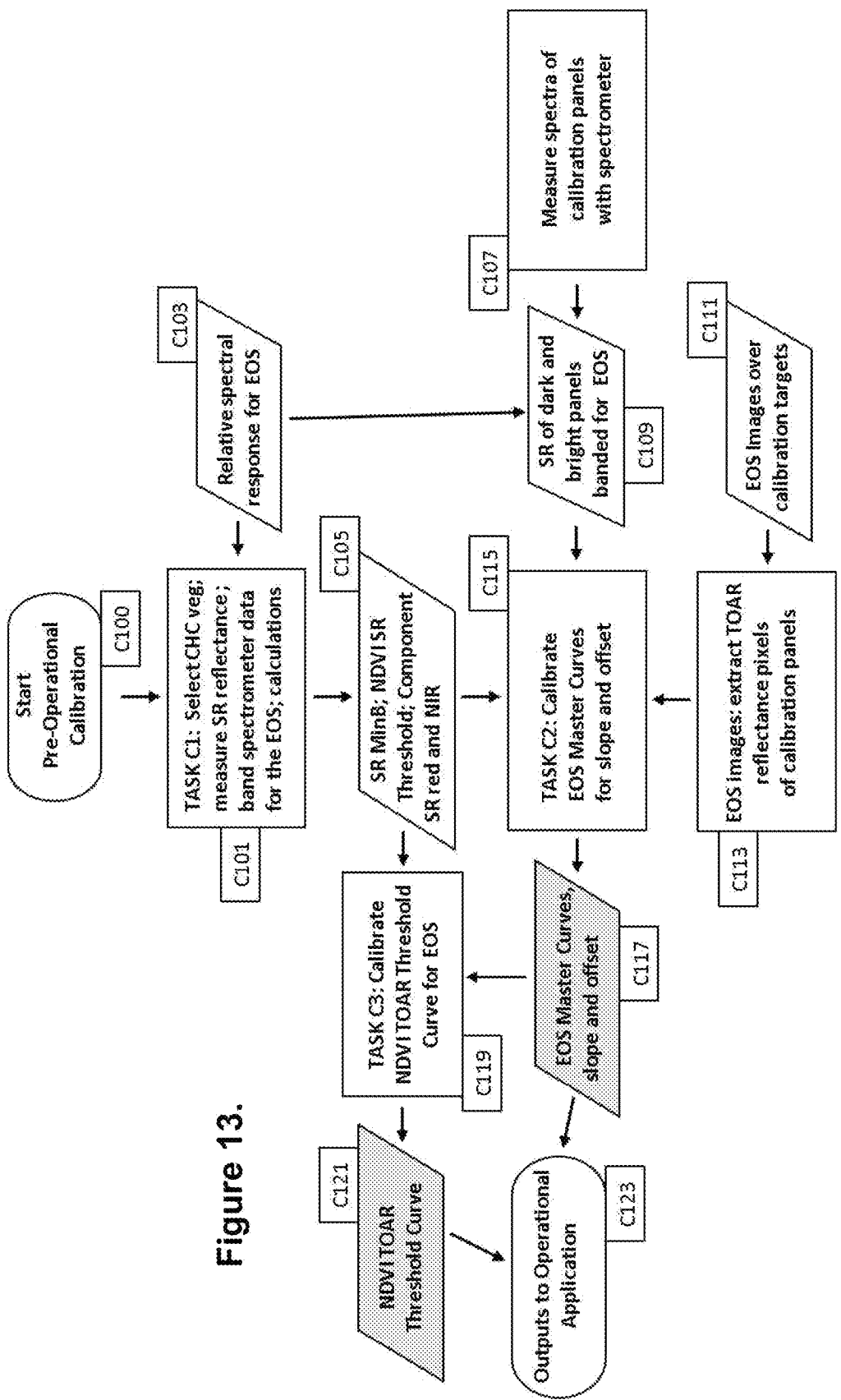
FIG. 13 is a flow chart describing the steps in the Pre-Operational calibration workflow.
Figure 14:
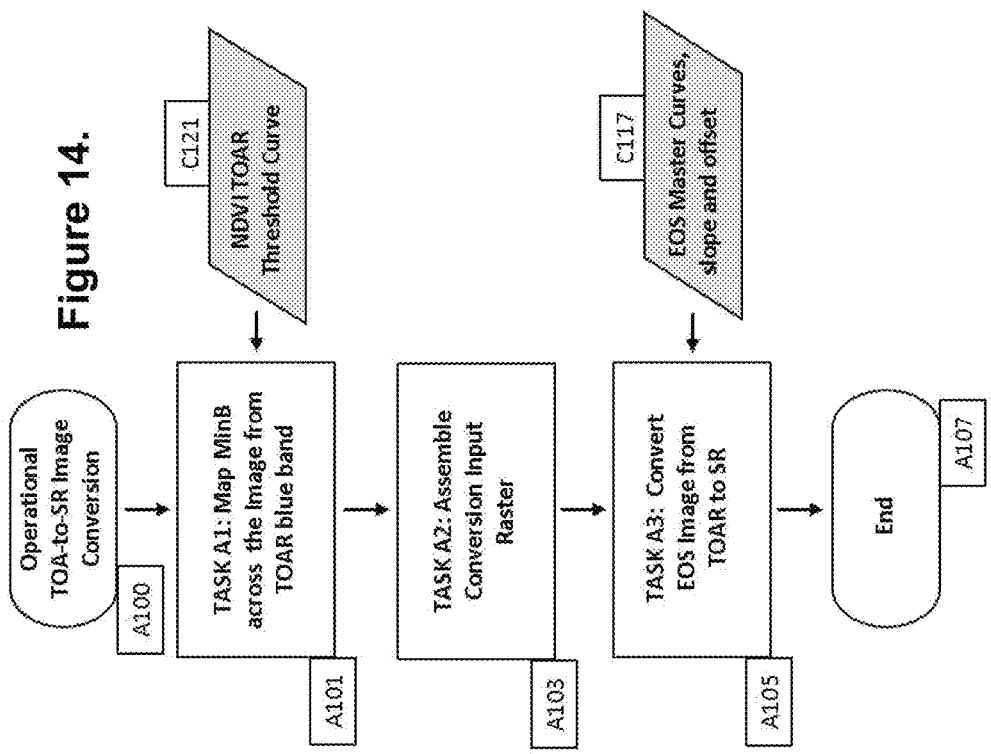
FIG. 14 is a flow chart describing the steps in the Operational Conversion workflow.

Three tasks are necessary for pre-Operational calibration (FIG. 13) and three tasks are necessary to take this preparatory work to then provide Operational Conversion of images from TOAR to (FIG. 14). These six tasks prepare and then Convert each band of the EOS. These tree tasks consist of steps that are referenced by the Task, a decimal point, and the numbered step. For example, Step C1.1 refers to the first step of Task C1.

As a person with ordinary skill will understand, the tasks and steps described for the calibration and application of the Conversion can be performed in different order or with other alterations, such as the calibration of some steps using machine learning that yield substantially the same results as the procedures described here. Such alterations require the insights provided by the conceptual model and the mathematics derived from it to Convert TOA data to SR, and all such alterations are incorporated within this disclosure.

Pre-Operational Calibration

FIG. 13 is a flowchart for Pre-Operational calibration beginning at C100, proceeding to Task 1, Step C1.1 at C101. This workflow provides two relationships needed for Operational Application.

Task C1. Defining Parameters for the Calibration. These parameters are SR MinB, and the associated SR Red and NIR that define NDVI used to identify CHC vegetation by the NDVI SR Threshold. These parameters are determined using spectroscopy in Step C1.1, a step that may be needed only once; subsequent steps in this task translate the resulting spectra for a new EOS.

Referencing FIG. 13, all steps remain within Box C101:
1. At C101 numerous plots of CHC vegetation are chosen that have continuous healthy canopies exposed to the open sky. This vegetation cover can be chosen by appearance as having a healthy uniform green canopy. Cultivated crops or lawn grass can work well for this operation; however, canopies of multiple plant types ensure that the method is more representative. Spectrometer measurements of these canopies can be performed on a clear day within a four-hour period centered on noon. The spectrometer foreoptic (067 of FIG. 6) can be raised above the plots to cover a sufficiently wide field of view to capture multiple plants at a time. Raising the foreoptic can avoid spectra with extreme variation from sampling individual leaves or the shadow between leaves rather than the continuous canopy.
2. The spectra are translated into the band-wise reflectance for an EOS using the relative spectral response for each EOS band that is input at C103.
3. The dataset from multiple plots are pooled and the median blue SR is calculated—this is the calibrated value used in later steps as an SR reference value to estimate the lumped parameter atmospheric effects of TOA MinB. This is SR MinB that passes in Box 105 to additional calculations
4. Remaining within box 101, NDVI is calculated from the paired red SR and NIR SR values using Equation 2 and a moderately low NDVI reflectance value, for example the $25^{th}$ percentile value is chosen as the NDVI SR Threshold.
5. From the NDVI values of Step C1.4, a sample around the chosen NDVI SR Threshold is chosen, for example within plus or minus 0.005 NDVI. The component SR red and NIR values that contributed to these sub-sampled NDVI values are then determined.
6. The median value of the red SR and NIR SR from the subsampled distribution of Step C1.5 are calculated and used to represent Red SR Reference and the NIR SR Reference.
7. At C105, the SR MinB, the NDVI SR Threshold and the Red and NIR SR References developed for the EOS are output to Task 2.

Task C2. Calibrating the EOS for the Conversion. The calibration can include all bands of the EOS by employing a calibration target and relating spectrometric measurements of the SR and the corresponding TOAR obtained from the image data of multiple overpasses of the EOS Referencing FIG. 13, all calculations remain within C115 or are fed through it from C105, C107, C109, C111 and C113. Task C2 is a complex of calculations and inputs that culminates in production of EOS Master Curves (C117) that are output at C123:
1. Task C2 starts at C107 with measurement of SR of dark and bright panels of the calibration target using a spectrometer as close to the time of the EOS overpass as practical or interpolated between periodic spectrometer measurements.
2. At C109, the SR measurements of the calibration target panels are banded for the EOS using the relative spectral responses from C105.
3. In C115, SR is determined for the bright and the dark panels for each band by averaging and banding at C109, the spectrometer collected SR collected at C107. This step results in one SR value for each dark and bright calibration target panel.
4. At C111, multiple TOAR images of the calibration target are collected by the EOS.
5. At C113 the dark and bright TOAR for one to many pure pixels of each calibration target panel are extracted for each band. The pure pixel values are averaged to provide one value of reflectance each for the dark and bright panels.
6. Returning to C115, Task 2 calibration resumes. The SR from Step C2.3 and TOAR from Step C2.5 are combined to yield two points for the overpass per the conceptual model of FIG. 3 that has an x-axis as SR and the y-axis representing the quantity TOA-SR. This calculation is performed for each band to generate one value each of slope and offset for each band for the overpass establishing bandwise TOA Deviation Lines.
7. Remaining at C115, the slope and offset of the bandwise TOA Deviation Lines are calculated from the two points for each band.
8. Remaining at C115, the TOA Deviation Line of the blue band is evaluated to determine a TOA MinB for each overpass that is used for all bands. This procedure finds the y-value corresponding to the SR MinB value established in Step C1.3, calculated from the TOA Deviation Line using the slope and offset from Step C2.7 with input of the SR MinB. For each overpass, the SR MinB value is added to the TOAR blue value calculated to yield the TOAR MinB that is the surrogate measure of the AODg effects that caused the deviation from SR represented by the TOA Deviation Line.

9. Steps C2.4 through C2.8 are repeated for the EOS bands of multiple images obtained over the calibration target with various conditions of AODg from clear to highly hazy conditions represented by the surrogate measure. This step generates an EOS Calibration Set that consists of two values for each band from each overpass: the slope and offset of the TOA Deviation Line. The TOAR MinB value associated with the overpass is generated as described in Step C2.8 and used for all bands. These values constitute an EOS Calibration set.

10. Master curves for each band of the EOS are generated from the EOS Calibration Set forming a function for slope and a function for offset as dependent variables upon the independent variable TOAR MinB. The master curves provide the only two parameters needed for converting TOAR to SR for each band of the EOS as described in Equation 1. Two example Master Curves are shown for the green and red bands of Sentinel 2 in FIG. 8.

11. At C117, the EOS' Master Curves, slope and offset are output for each EOS band for Operational Application (C123).

Task C3. Calibrating the NDVI TOAR Threshold Curve. Task C3 finds the TOAR MinB values that represent only those pixels generated by CHC, and therefore, candidate TOAR MinB pixels to represent the lumped parameter AODg. For this Operational use, the NDVI SR Threshold output at FIG. 13, Step C1.7 can be translated across the Operational range of TOA MinB values to adjust the NDVI threshold downward corresponding to the red and NIR reflectance changes driven by increasing TOAR MinB. This adjustment creates an NDVI TOAR Threshold Curve that can be used to confirm that the candidate TOAR MinB was generated from CHC vegetation.

Referencing FIG. 13:

1. Task C3 begins at C119 by receiving the NDVI SR Threshold along with the Red SR Reference and the NIR SR Reference components that contributed to it. For this calculation, the red and NIR TOAR are calculated from their SR reference values using an inversion of Equation 1 and EOS Master Curves input from C117. Simulated Input values can be chosen for TOAR MinB as input to adjust the Red SR Reference and the NIR SR Reference to their TOAR equivalent recorded for each step of simulated MinB.

2. Remaining at C119, the TOAR red and TOAR NIR at each TOAR MinB from Step C3.1 are combined to calculate TOAR NDVI using Equation 2. The TOAR NDVI values arising from these inputs can be plotted against the independent variable TOAR MinB to yield points to fit a function for the NDVI TOAR Threshold Curve, a dynamic threshold of values across a range of TOAR MinB (FIG. 12). This curve is used to confirm whether blue reflectance values have been generated by CHC through calculating a TOAR NDVI Threshold value at any TOAR blue input.

3. At C121 the NDVI TOAR Threshold Curve is output for Operational Application Pre-Operational calibration ends at C123 with the output of the two Master Curves for each EOS band and the NDVI TOAR Threshold Curve.

4. C123 provides the input for SR Conversion for the calibrated EOS from then on, but subject to recalibration in the event of sensor drift.

Operational Application

With calibration completed, the Conversion can be applied to any image recorded by that EOS. Operational Application of Conversion is described for a single image of the EOS, Task A1. Mapping TOAR MinB across an image to be corrected. At A101 of FIG. 14, the NDVI TOA Threshold Curve comes into play by removing the blue pixel values that are not acceptable for TOAR MinB. A series of steps perform this reduction culminating in the use of Pixel Grid Sampling to choose the TOAR MinB value to represent the region inside the pixel gridcell. This reduction is performed using rasters that result in a pooled sample of low blue reflectance values confirmed to have been generated by CHC vegetation. These TOAR MinB candidates are then subjected to statistical sampling to choose a value to represent the area within the pixel grid. The final step for Pixel Grid Sample either fills the gridcell with a TOAR MinB value or skips to the next gridcell until all gridcells have been sampled and filled or left empty across the image. These steps remain within Box A101.

Referencing FIG. 14:

1. At A101, for the selection of MinB, a first raster step removes all pixels from consideration that have TOAR NIR values well below a threshold representing CHC under TOA conditions. This step masks pixels from consideration that have low reflectance due to causes independent of vegetation. This TOAR NIR threshold can be sufficiently high to remove all pixels with TOAR blue values that are low due to light absorption by water or pixel mixing that includes water. This step does not eliminate pixels with reduced NIR reflectance of vegetation due to severe AODg-induced effects.

2. In a second raster step, high blue reflectance values are removed from consideration across the image using a threshold that discriminates the point at which MinB becomes too high for accurate Conversion. If desired, pixels that are so identified can be flagged in an avoidance raster that then is used to bypass correction for any pixel with a high TOAR blue value that occurs only for snow, clouds and bright rooftops generally not of interest as surface reflectance.

3. A third raster step within A101 is to calculate raster of TOAR NDVI according to Equation 2 using the TOAR rasters of red and NIR bands from the image as input.

4. Remaining at A101, the NDVI TOAR Threshold value for each of the residual pixels is compared to the NDVI TOAR value for that pixel. If the NDVI TOAR value is less than the corresponding NDVI TOAR Threshold value it is removed, thus leaving a raster of only candidate TOAR MinB pixels.

5. Remaining at A101, the final step for mapping TOAR MinB is to perform Pixel Grid Sampling of residual blue TOAR values. The residual blue pixel values are pooled and ranked within each gridcell.

6. From the ranked population of blue TOAR pixel values, a single MinB value is chosen from a set low quantile, for example at the $15^{th}$ percentile. This non-zero quantile is chosen to eliminate candidate minB values that may be erroneously low.

7. The low percentile blue pixel value culminating from the foregoing steps is the TOAR MinB for the gridcell. The Pixel Grid Sampling procedure continues across and down the image until all gridcells have either been filled with a MinB value or skipped because no appropriate MinB values were found that passed the three raster steps in A1.1 through A1.3 that culminated with the removal of all candidate TOAR MinB values not generated by CHC vegetation.

8. The resulting gridcell-based raster of TOAR MinB values across the image may contain outlier values that can be removed through additional steps before taking up the next two tasks. This procedure can apply statistical comparisons from adjoining gridcells to ensure that the values are not comparatively high or low and can remove the TOAR MinB values from any gridcells that are isolated and cannot be verified statistically by comparison to their nearest neighbors.

Task A2. Assembling the Conversion Input Raster. The final step in image preparation for atmospheric correction is to assemble the Conversion Input Raster with at least some useable percentage of gridcells across the image filled with MinB values. In nearly all cases, the raster of MinB values generated in Task A1 will have various proportions of the gridcells that have missing MinB values. Depending upon the presence of nearby TOAR MinB values, empty gridcells can be filled by interpolation. The three steps in Task A2 remain within box A103 of FIG. 14:

1. Gridcells not filled in Task A1 can be filled through interpolation and extrapolation by geostatistical methods, for example by inverse-distance-weighted methods. There are many options for this step that a person with ordinary skill will understand how to select and perform.
2. If the proportion of TOAR MinB-filled gridcells is insufficient to permit spatially-sensitive Conversion to SR, a median value can be chosen from the pooled MinB values to serve as a single value to drive SR Conversion across the image.
3. If no valid MinB values can be found, a MinB value can be applied across the image for the SR Conversion that typifies conditions found in the region and season that the image was acquired.
4. Task A2 ends with a raster of TOAR MinB with all gridcells filled preparatory to the Conversion of the TOAR of each band into SR estimates across the entire image. This is the Conversion Input Raster that is passed to Task A3.

Task A3. Operational Conversion to surface reflectance is performed using the Conversion Input Raster from the TOAR pixel values for all bands of the image. All steps in Task A3 remain in box A105 of FIG. 14. Image Conversion employs Equation 1 and input of the Master Curves.

1. The MinB values in the Conversion Input Raster assembled in Task A2 specify the Conversion for each pixel of the EOS image by providing input to the slope and offset Master Curves developed for the EOS of interest at C117. This step generates rasters of slope and offset for each band across the entire image.
2. For Conversion of TOAR rasters to an SR raster for each spectral band of the EOS, Equation 1 requires only three raster inputs—the TOAR of each band to be corrected, and the rasters of slope and offset from Step A3.1. These three rasters are the input for calculation of SR using Equation 1 for each band for each pixel across the image. This step completes the Conversion and delivers SR values from TOAR for the bands of the image.

Task A3 concludes the Conversion of TOAR to SR for an image of an EOS that has been calibrated for this method. Once calibrated, the method uses only the statistics of reflectance in that TOAR image to effect the Conversion to SR.

The Conversion has been described for EOS orbiting above the atmosphere; however, the Conversion is also appropriate for high altitude aircraft such as drones and balloons flying well above commercial air traffic. In this case, Conversion to SR is desirable because such altitudes lie above about 90% of the Earth's atmosphere and are therefore subject to the same AODg effects as orbiting EOS. Additionally, the same procedures for image conversion described herein are also appropriate to clear dust, thin clouds, and smoke from military drone imaging. These applications are incorporated herein.

Although this process has been described in detail with reference to these preferred embodiments, other embodiments can achieve the same results for the process of Converting TOAR to SR. The Conversion can be practiced employing generally conventional materials and equipment. Accordingly, the details of such materials and equipment are not set forth in detail herein. In this description, specific details are set forth, such as specific material, structures, procedures, etc. to provide a thorough understanding of the Conversion. However, as one having ordinary skill in the art will recognize, the Conversion can be practiced without resorting strictly to the details specifically set forth. For example, replacing closed form mathematics for generation of MinB with methods developed through spatially-based artificial intelligence while retaining other steps intact. In other instances, well known processing structures have not been described in detail, in order not to unnecessarily obscure description of the Conversion.

Only some embodiments of the Conversion and but a few examples of its versatility are described in the present disclosure. It is understood that the process is capable of use in various other combinations and is capable of changes or modifications within the scope of the inventive concept as expressed herein. Modification of these procedures will be well understood by those skilled in the art and it is intended to cover in the appended claims all such modifications and equivalents. The disclosures of all patents identified hereinabove are incorporated by reference.

7. Glossary of Specialized Terminology

Many terms used in this specification are commonly applied only to the field of remote sensing and additional terms required to explain this new science are introduced here. Technical terms of existing art are denoted "common"—all are well known in this field. All other terms are unique and describe the steps for calibration and Operational application. New terms used herein are capitalized and bolded within the following list and are capitalized throughout the text of this disclosure to emphasize that these descriptive terms are unique to the present art. In the interest of brevity, glossary terms may refer to other terms defined herein to aid more complete understanding of the meaning and context for the term.

Aerosol optical depth (AOD)—a common term for a dimensionless index of the influence of suspended particles upon TOAR. AOD has a much greater effect upon light transmittance than atmospheric gasses such as water vapor or ozone.

AODg—acronym for the combined effects of aerosol optical depth and gasses as a scalar measure of their combine effect upon light transmittance. AODg is evaluated as a lumped sum parameter value for the present process called MinB. Dealing with atmospheric properties as a lumped sum parameter provides a significant simplification that accommodates the interactive effects of the atmospheric constituents that are not completely understood in the art.

Atmospheric correction—common term for the conversion of images from TOAR to SR.

Axis—a point defined by y=0, no change between SR and TOAR, for any TOA Deviation Line that is caused by AODg effects. The Axle Point occurs where the effects of scatter and attenuation are equal and self-cancelling.

Bands (or spectral bands)—a common term for the wavelength windows that are measured by the sensors aboard an EOS. While bands may share the same general region of the spectrum, differences may occur within the window of measurement defined by the upper and lower detection limits of the bands and for the relative spectral responses within the band window.

Banding—a common term for the mathematical procedure that takes the continuous trace of spectrometer data and calculating one number typifying what the band of an EOS measures through integrating the product of the sensor relative spectral response and the hyperspectral reflectance, a quantity then divided by the integrated sensor relative spectral response.

Continuous Healthy Canopies—abbreviated CHC, is defined through calibration as a pixel exceeding a set value of SR NDVI chosen to represent a continuous, vigorous, and healthy vegetation canopy growing under an open sky. The term "healthy" connotes living, green and leafy—by contrast, a living canopy may lack leaves during the winter. Continuous cover in this definition assures that only leaves are viewed. For Operational image correction CHC is determined using an NDVI TOAR Threshold calculated as a function of the pixel's blue TOAR.

Conversion (also Convert and Converted)—a term to describing the present process that transforms TOAR SR.

Conversion Input Raster—a map expressing the spatial atmospheric effects as MinB mapped across an EOS image.

EOS—a common abbreviation for Earth observation satellites as the imaging satellites described within this present art. As used here, EOS is both singular and plural.

EOS Calibration Set—combined TOA Deviation Line data from many calibration target overpasses of an EOS that consist of a slope, an offset and a TOAR MinB generated from the overpass.

Image—a common descriptor used for an EOS raster of a single band or collection of bands that through atmospheric correction is Converted from TOAR correction to SR.

Master Curves—are the curves of slope and offset parameters that drive atmospheric correction. Master Curves of slope are paired with Master Curves of offset for each spectral band. These yield a unique solution for any MinB input value from the EOS.

MinB—the minimum reflectance of the blue band established for continuous healthy canopies (CHC), defined as a continuous, vigorous, and healthy vegetation growing under an open sky, and constituting a reference value, to assess the degree of atmospheric effect. Using an SR MinB as a reference value exploits the plant-mediated control of blue SR that falls within a consistently narrow and low reflectance range. In this capacity, a set value for SR MinB measured by spectrometry is a yardstick against which to judge the atmospheric effects by comparison to a TOAR measure of MinB on an image.

NDVI—a commonly used acronym for Normalized Difference Vegetation Index that is the most frequently used index to measure vegetation activity.

NDVI SR Threshold—the NDVI calculated from the red and NIR band values associated with the SR MinB measured over continuous healthy canopies of vegetation growing under an open sky. This value is determined statistically through multiple spectrometer measurements.

NDVI TOAR Threshold—a dynamic threshold calculated for NDVI to identify whether a TOAR blue pixel value was generated by CHC vegetation. NDVI TOAR values higher than the threshold are accepted as having been generated by CHC, and therefore, potentially acceptable as a surrogate measure of AODg.

NDVI TOAR Threshold Curve—a mathematical relationship calculated by inverting the Correction Equation to assess the effect of TOA MinB upon the TOAR of red and NIR bands across a range of MinB inputs, thus expressing a curve of NDVI TOA Threshold values as a function of MinB.

NIR—a common abbreviation for a near infrared spectral band of EOS.

NIR SR Reference—is the NIR SR that contributed to the NDVI SR Threshold.

Pinwheel Effect—a descriptive term for the relative changes of a cumulative distribution function of TOAR that occurs through effects from AODg causing the low reflectance to increase and high reflectance to decrease. Viewed as a cumulative distribution, this causes the distribution to spin counterclockwise, hence the name.

Pixel Grid Sampling—an operation performed by sampling across an image raster from within non-overlapping gridcells. Pixel grid sampling is performed to identify spatially discrete TOA MinB to form each image specific Conversion Input Raster to drive image Conversion.

Radiance—a common term for the flux of light recorded by an instrument, for example a spectrometer or a sensor for an EOS spectral band.

Raster—a common term for a rectangular pattern of parallel lines of pixels forming an image. For EOS remote sensing, these pixels are square and abut one another without spacing.

Red SR Reference—is the red SR that contributed to the NDVI SR Threshold.

Reflectance—commonly used unitless ratio that, for EOS data. Is the light reflected from a ground target normalized by the radiance of sunlight impinging upon it when measured at the ground level. For EOS measurements, this term is the measured radiance normalized by calculated solar radiance above the atmosphere.

Relative spectral response—a common term describing the quantum efficiency of a sensor at specific wavelengths over the range of a spectral band.

Spectrometer—a common term for an instrument that precisely measures radiance or reflectance providing the output as a continuous trace across the spectrum.

Surface reflectance—(abbreviated SR) a common term for reflectance that would be measured at ground level, defined as the ratio of the radiance of reflected light divided by radiance of sunlight received at the ground that is measurable with a spectrometer.

TOA—a common acronym for top-of-atmosphere. For EOS data this is what is recorded that includes the changes due to atmospheric effects TOA Deviation Line—a line that depicts changes of SR due to atmospheric effects that enables correction of TOAR to SR.

TOAR—an acronym for top-of-atmosphere reflectance that is the EOS TOA radiance divided by a theoretically-based calculation of TOA solar radiance.

I claim:

1. A method for mitigating atmospheric degradation in satellite images, the method comprising:
   obtaining a subject image digitally generated by an observation device located above Earth's surface, the subject image comprising a plurality of pixels containing a reflectance signal that has been degraded by an atmosphere;
   for a first set of one or more pixels in the subject image, determining an atmospheric effect based on a comparison, within the first set of one or more pixels, between one or more top-of-atmosphere reflectance (TOAR) values for vegetation and known surface reflectance properties for the vegetation; and
   applying to at least a second set of one or more pixels of the subject image a correction selected based on the comparison between the TOAR values in the first set of one or more pixels and the known surface reflectance properties for the vegetation, thereby obtaining a corrected image that approximates surface reflectance measurements for objects at ground level, wherein the second set of one or more pixels is different than the first set of one or more pixels.

2. The method of claim 1, wherein the observation device is an Earth observation satellite (EOS).

3. The method of claim 1, wherein the observation device obtains radiance data for the one or more pixels, and the radiance data is converted to reflectance prior to applying the correction to the second set of one or more pixels in the subject image.

4. The method of claim 1, wherein determining the atmospheric effect comprises representing the atmospheric effect as a line having a slope value and an offset value.

5. The method of claim 4, wherein applying the correction comprises using a closed form equation to mitigate the atmospheric effect with inputs that include at least one TOAR value for at least one of the second set of pixels and the slope value and the offset value for the line representing the atmospheric effect for that pixel.

6. The method of claim 5, wherein the closed form equation is:

$$SR=(TOAR-b)/(1+m)$$

where SR is surface reflectance, TOAR is top-of-atmosphere reflectance, b is the offset value, and m is the slope value for the line representing the atmospheric effect.

7. The method of claim 1, wherein applying the correction comprises applying an equation to each of the plurality of pixels of the subject image in a raster.

8. The method of claim 7, wherein applying the correction comprises using one or more slope values and offset values.

9. The method of claim 1, wherein determining the atmospheric effect further comprises:
   identifying the first set of one or more pixels by determining that they contain the vegetation;
   obtaining at least one TOAR value for the first set of one or more pixels containing the vegetation; and
   using a difference between the known surface reflectance reference properties for the vegetation and the at least one TOAR value for the first set one or more pixels containing the vegetation as an estimate of the atmospheric effect in the one or more pixels of the first set containing the vegetation.

10. The method of claim 9, further comprising partitioning the subject image into a plurality of cells and, for each of the cells that contain the vegetation, determining the atmospheric effect within that cell.

11. The method of claim 4, wherein a plurality of prior images generated by the observation device that generated the subject image are used to calibrate the slope value and the offset value.

12. The method of claim 11, wherein a calibration target with at least one dark panel having a first known surface reflectance and at least one bright panel having a second known surface reflectance are used to calibrate a relationship between: (i) the atmospheric effect; and (ii) the slope value and offset value.

13. The method of claim 12, wherein TOAR data from each of a plurality of prior images obtained over the dark and bright panels are used with the known surface reflectance of the dark and bright panels to generate a plurality of slope values and offset values that collectively represent a plurality of atmospheric effects.

14. The method of claim 11, further comprising using a plurality of slope values obtained from the plurality of prior images to generate a slope curve with the plurality of slope values as a function of atmospheric effect.

15. The method of claim 14, further comprising using a plurality of offset values obtained from the plurality of prior images to generate an offset curve with the plurality of offset values as a function of atmospheric effect.

16. The method of claim 15, further comprising using the slope curve and the offset curve to translate a raster of atmospheric effect into a raster of slope values and a raster of offset values.

17. The method of claim 15, further comprising using the slope curve and/or the offset curve to generate at least one of an extrapolated slope value and an extrapolated offset value that is outside of a range for which the slope curve and/or the offset curve is calibrated.

18. The method of claim 7, wherein the equation is a closed-form equation that is configured to convert TOAR to surface reflectance.

19. The method of claim 1, wherein determining the atmospheric effect and applying the correction are performed using a model for which all inputs are contained in or derived solely from the subject image.

* * * * *